: US 7,586,946 B2

(12) United States Patent
Pomaranski et al.

(10) Patent No.: US 7,586,946 B2
(45) Date of Patent: Sep. 8, 2009

(54) METHOD AND APPARATUS FOR AUTOMATICALLY EVALUATING AND ALLOCATING RESOURCES IN A CELL BASED SYSTEM

(75) Inventors: Ken Gary Pomaranski, Roseville, CA (US); Andrew Harvey Barr, Roseville, CA (US); Dale John Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 641 days.

(21) Appl. No.: 11/263,502

(22) Filed: Oct. 31, 2005

(65) Prior Publication Data

US 2007/0098014 A1    May 3, 2007

(51) Int. Cl.
*H04J 3/22* (2006.01)
(52) U.S. Cl. ..................................... 370/468
(58) Field of Classification Search ............... None
See application file for complete search history.

(56) References Cited

U.S. PATENT DOCUMENTS 6,768,901 B1    7/2004  Osborne et al.

6,977,927 B1 *  12/2005  Bates et al. ............... 370/381
7,249,179 B1     7/2007  Romero et al.
2005/0160428 A1  7/2005  Ayachitula et al.
2007/0028068 A1* 2/2007  Golding et al. ............ 711/170

FOREIGN PATENT DOCUMENTS

JP          63008833       1/1988
JP          H06-110717 A   4/1994
JP          2002-207712    7/2002

OTHER PUBLICATIONS

Kelly, Utility-Directed Allocation, Hewlett-Packard, 7 pages, Jun. 2003.*
Eilam et al, Using a Utility Framework to Develop Utility Systems, IBM, 24 pages, 2004.*
"Translation of Japanese Office Action for JP2006-292487", (Apr. 13, 2009).

* cited by examiner

*Primary Examiner*—Frank Duong

(57) ABSTRACT

Embodiments of the invention provide a method and apparatus for automatically evaluating and allocating resources in a cell based system. In one method embodiment, the present invention receives a request to generate a cell based system of resources. A list of allocatable resources having corresponding evaluation data is then accessed. The request for the cell based system is then compared with the list of allocatable resources having corresponding evaluation data. The allocatable resources are then assigned to the cell based system.

15 Claims, 5 Drawing Sheets

METHOD AND APPARATUS FOR AUTOMATICALLY EVALUATING AND ALLOCATING RESOURCES IN A CELL BASED SYSTEM

TECHNICAL FIELD

The present invention generally relates to resource allocatable computing environments. More specifically to a system and method for automatically evaluating and allocating resources in a cell based system.

BACKGROUND ART

Modern networking continues to provide an improvement in communication and information access. As an example, in-house data centers, associated with a particular entity of interrelated group of users, could contain a large number of information technology (IT) resources (e.g., cells) that are interconnected through a network (e.g., cell based systems). These networks, or cell based systems, are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems, switches, routers, load balancers, firewalls, and the like.

Many modern networks also include a plurality of redundant subsystems such as servers, disk logical units (LUNs) in a disk array, network switches in the LAN, and the like. In addition, a network may be organized in a virtual LAN (VLAN) including a plurality of the resources within the LAN network. In some cases, the collection of computational devices contained in these VLANs is referred to as farms. The network is referred to as a VLAN because the actual network (e.g., the wiring, cables, etc.) is not reconfigured, instead, the network will be virtually assigned (e.g., with the use of software) the resources specific to the VLAN. Thus, the physical network remains the same, but the actual utilization of the network can be divided into distinct LANs virtually.

For example, a user may request a cell based system (or farm) including a server, a LUN, and two ports on a network switch. The network will then select, configure and deploy the computational devices to establish a cell based system of devices for the user. The user's cell based system would then be active as long as the user requested it and/or utilized it. After the user was finished with the cell based system, the resources would be reabsorbed into the resource pool to await reassignment.

During the set-up of the network, there may be a plurality of selectable redundant cells or systems for the farm. In general, the cell resources are currently allocated based on a hardware or software convenience or by simple ordinal conventions. For example, if the set of resources are numbered or addressed as 0 to n, the normal default is to allocate the resource 0 as the first cell resource. In the case where the resource 0 is not the best resource in the pool of resources, allocating resource 0 will deleteriously effect the operation of the network.

This method of allocating cell resources based on device address is worse than even a random method of allocating resources. For example, since the primary resource allocation is always the same resource, e.g., resource 0, if resource 0 is slow or error prone each primary resource allocation will result in a slow or error prone component in the cell based system. Additionally, when the primary allocated resource is error prone, the opportunity for an unscheduled switchover to a secondary resource in the resource pool is increased. As is well known, unscheduled switchovers often result in loss of data, system downtime, system slowdown, and the like.

DISCLOSURE OF THE INVENTION

Embodiments of the invention provide a method and apparatus for automatically allocating resources in a cell based system. In one method embodiment, the present invention receives a request to generate a cell based system of resources. A list of allocatable resources having corresponding evaluation data is then accessed. The request for the cell based system is then compared with the list of allocatable resources having corresponding evaluation data. The allocatable resources are then assigned to the cell based system.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Figure 1:
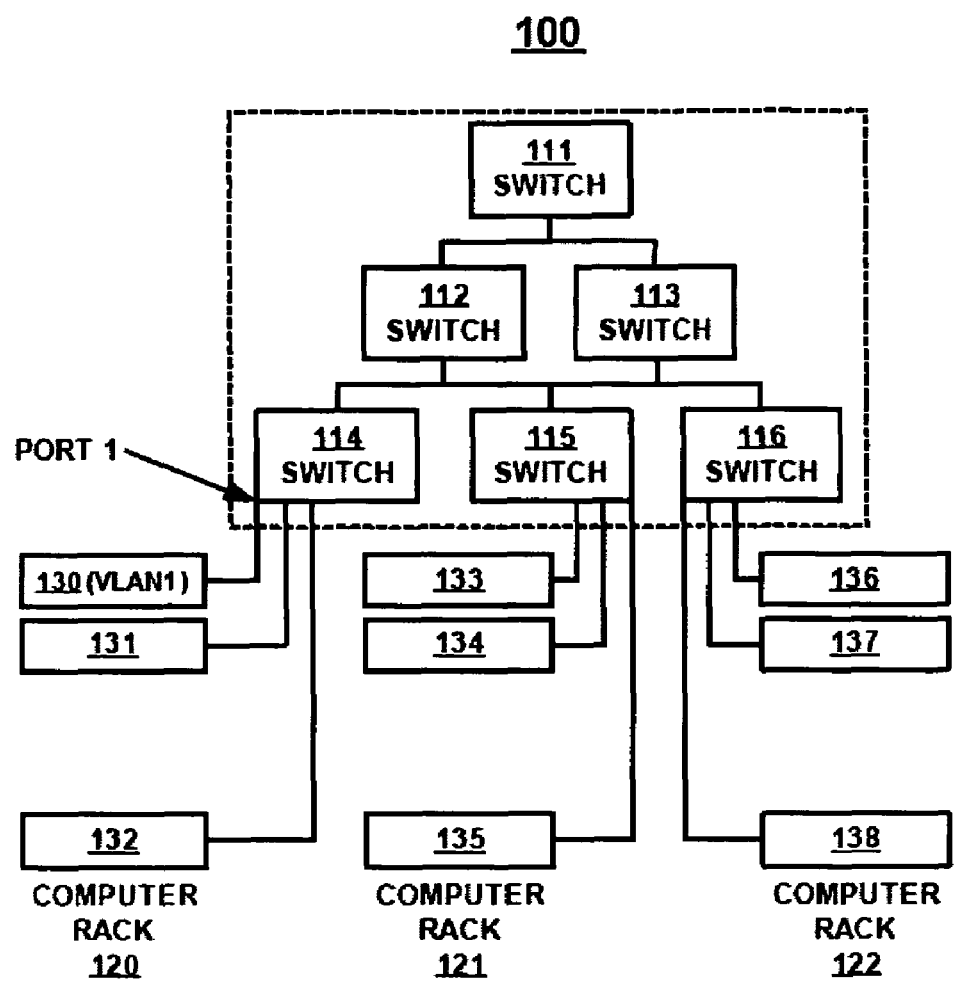
FIG. 1 is a block diagram of an exemplary LAN upon which embodiments of the present invention can be implemented.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments provide an automated method and apparatus for evaluating and allocating resources in a cell based system. For example, current cell based systems partition resources between different OS instances primarily based on the performance required by the particular OS and on the required connectivity. For example, it may be determined that a particular OS may need 'x CPUs', 'y Mbytes of memory' and connectivity to 'a, b, or c IO cards'. The partition manager will then assign resources to the OS based on this requirement.

Embodiments described herein improve upon this common resource allocation method by adding the dimensions of desired availability and resource quality into resource allocation decisions. This allows for the 'right' amount and quality of hardware to be assigned to a particular operating system and resource farm (partition). For instance, suppose a partition needs connectivity to disk drive 'x'. A mission critical resource would be assigned a primary and a redundant path to that disk drive, and a resource for a low priority application would get only ONE path to that disk, therefore saving system resources.

In addition, embodiments described herein also solve the problem of the deterioration of resources operation by doing dynamic re-allocation of allocated resources based on user settable parameters.

With reference now to FIG. 1, a block diagram of an exemplary local area network (LAN) 100 upon which the method and system for evaluating and allocating resources in a cell based system can be utilized is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein. Although a LAN is described herein, embodiments of the present invention are well suited for utilization with other types of networks and internal/external devices that are connected via forms of 'communications networks' and busses such as described in FIG. 2.

In one embodiment, the network 100 includes a storage array. In another embodiment, the network also includes a storage area network (SAN). In yet another embodiment, the network includes a LAN, a SAN and a storage array. The present FIG. 1 is merely one of a plurality of possible network farm configurations that are within the scope of the network environment shown for purposes of clarity.

In the present embodiment, LAN 100 includes a number of switches 111 through 116, and a number of computers 130-138 that are coupleable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of virtual LANs (VLANs) or farms. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure.

In addition to computer systems and switches, LAN 100 can include other types of devices such as, but not limited to, routers, load balancers, firewalls, and hubs. These other types of devices may also be programmable or configurable.

Figure 2:
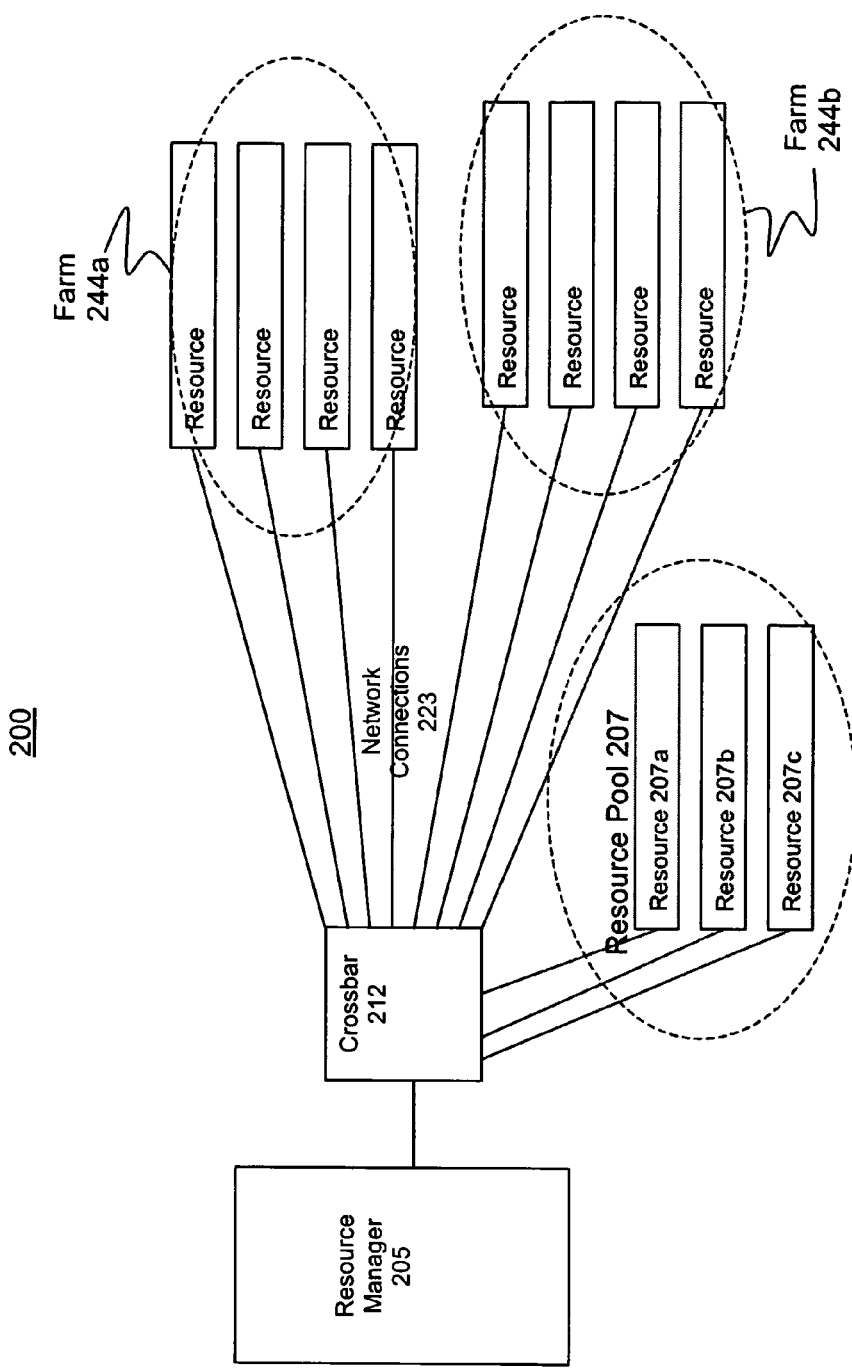
FIG. 2 is a block diagram of an exemplary network configuration upon which embodiments of the present invention can be implemented.

With reference now to FIG. 2, a block diagram of an exemplary network configuration is shown in accordance with one embodiment. That is, FIG. 2 shows one embodiment of the system hardware implementation. In one embodiment, system 200 includes resource manager 205, a crossbar 212, a resource pool 207, a plurality of network connections 223, a first farm 244a and a second farm 244b.

In one embodiment, the resource manager 205, crossbar 212, resource pool 207, plurality of network connections 223, first farm 244a and second farm 244b are located in a proximal location. However, in another embodiment, the resource manager 205, crossbar 212, resource pool 207, plurality of network connections 223, first farm 244a and second farm 244b are in separate locations.

In general, the crossbar 212 is a switch that remaps devices (e.g., resources) based upon which resource is designated. That is, the crossbar 212 maps the physical address of a resource to the appropriate logical address to establish the virtual resource allocation. For example, the CPU resources 207 have physical addresses 0, 1, 2 ... n. However, during the allocation of the resources, three CPU resources 207 are assigned to the first farm 244a. Regardless of the physical addresses of the CPU resources the CPU resources will be reassigned with logical addresses 0, 1 and 2. Therefore, the operating system (O/S) running on farm 244a will recognize the CPU resources as having expected addresses. That is, it will appear to the O/S that the CPU resources are running on there own system even though it is only virtual. Moreover, by utilizing the crossbar 212, if replacement of a resource is required, the crossbar 212 can simply remap the previously utilized logical address to a new physical address (e.g., a new resource) and the transition to the new resources will be transparent to the resource manager 205.

Resource pools 207 are highly flexible, comprising any conceivable combination of data servers, computational capability, load balancing servers or any other device or capability imaginable. Because the possible varieties of resources that can be included in resource pools 207, in one embodiment, they are separated from by software or hardware firewalls or both, in many combinations.

It is noted that embodiments of the present invention can run in many different environments. One network management environment in which an embodiment operates serves as an end-to-end service management infrastructure and is particularly well suited to managing a provisionable network which is known as a utility data center (UDC).

In one embodiment, the resource manager 205 maintains a list of each individual network device (e.g., resource) and the attributes and qualities of the device. For example, the attributes of a device may include, but are not limited to, the make, model, type, role, and unique identifier of the device. The qualities of the device includes: error rate, performance characteristics, configuration (e.g., mirrored memory, non-mirrored memory) and the like which in one embodiment are periodically checked and retested. Additionally, the network manager may list each individual connection 223 that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable.

In one embodiment, the connections 223 are connected to switches such as the switches 111-116 of FIG. 1. In general, the switches are capable of being programmed or configured such that network 200 is logically separated into a number of VLANs or farms (e.g., 244a and/or 244b). The programming or configuring of these switches can be changed, thereby changing the resources allocated to the various VLANs. Moreover, each VLAN or farm is considered a trusted infrastructure.

In addition to computer systems and switches, network 200 can include other types of devices such as, but not limited to, routers, load balancers, firewalls, and hubs. These other types of devices may also be programmable or configurable.

Operation

Figure 3:
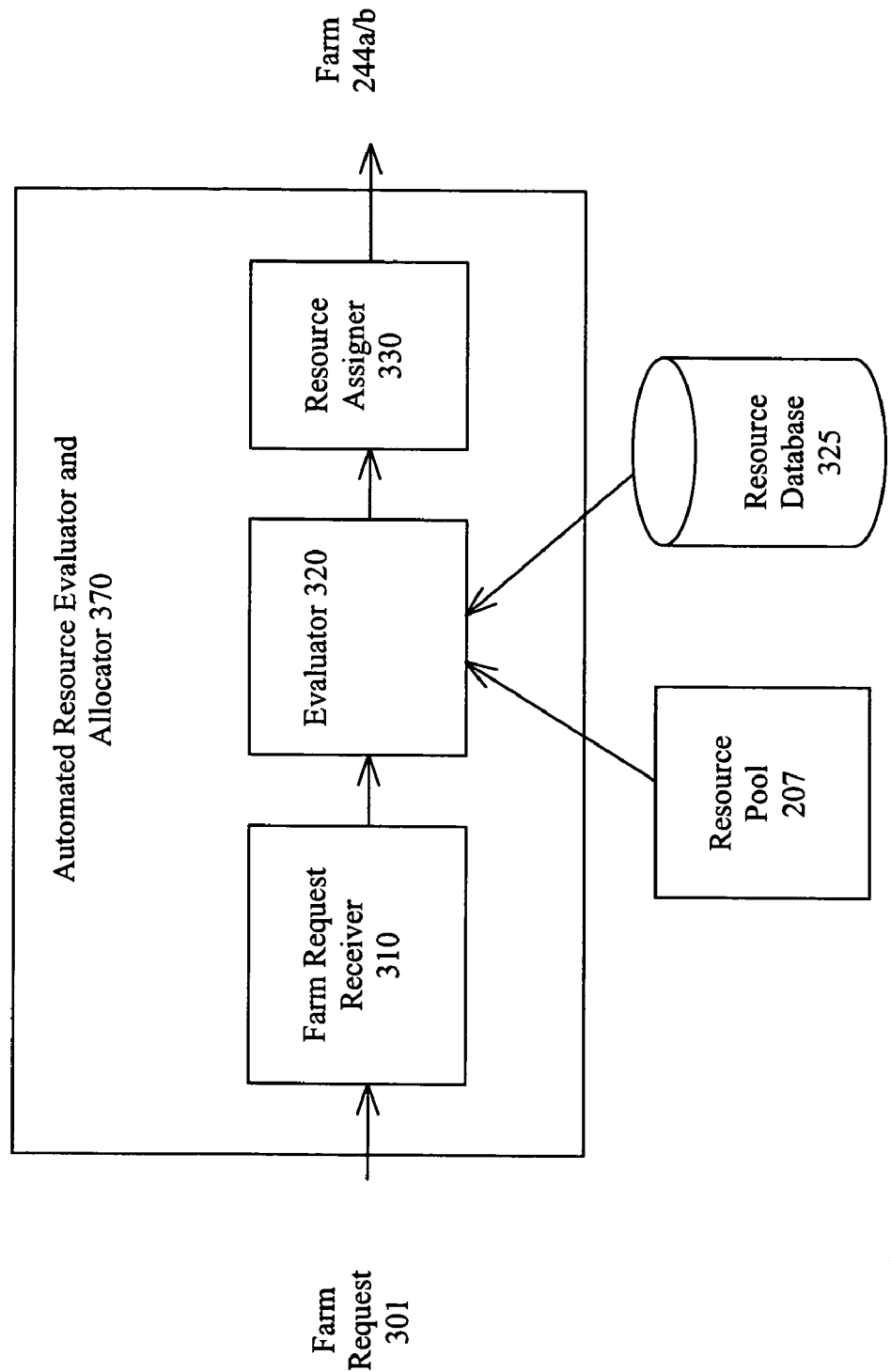
FIG. 3 is a block diagram of an exemplary automated resource evaluator and allocator in accordance with one embodiment of the present invention.

With reference now to FIG. 3, a block diagram of an exemplary automated resource evaluator and allocator 370 is shown in accordance with one embodiment of the present invention. In one embodiment, the automated resource evaluator and allocator 370 includes a farm request receiver 310, an evaluator 320 and a resource assigner 330. In one embodiment, the automated resource evaluator and allocator 370 also includes a resource pool 207 and resource database 325. In another embodiment, the resource pool 207 and resource database 325 are accessed by the automated resource evaluator and allocator 370 but are located outside of the automated resource evaluator and allocator 370. As described in detail herein, a resource pool 207 containing a plurality of resources is accessed by the automated resource evaluator and allocator 370 for testing. In addition, a farm resource is selected from the resource pool 207 based on the results of the testing.

Figure 4:
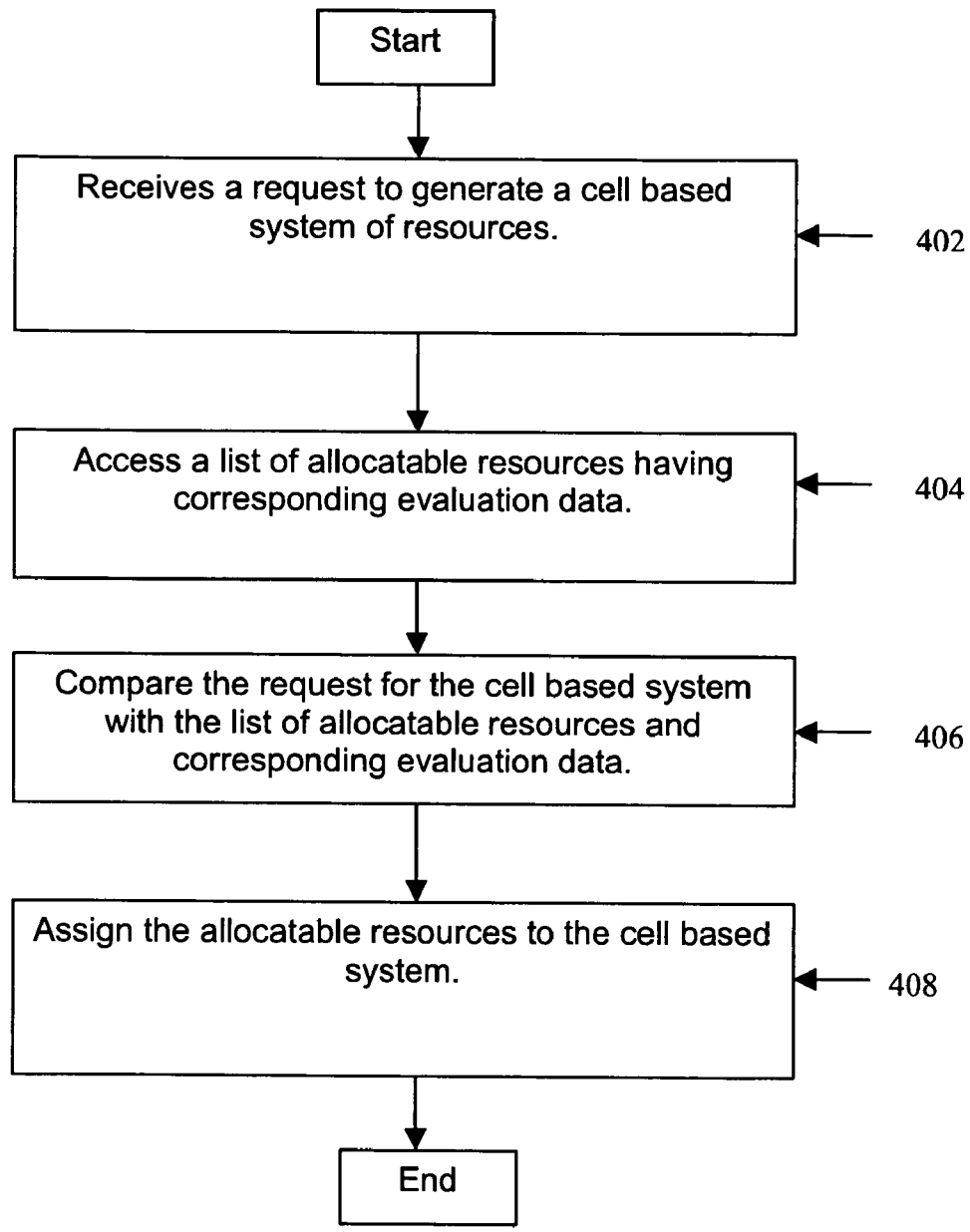
FIG. 4 is a flowchart of an exemplary method for automatically evaluating and allocating resources in a cell based system in accordance with one embodiment of the present invention.

Referring now to FIG. 4, a flowchart of an exemplary method for automatically evaluating and allocating resources in a cell based system is shown in accordance with one embodiment of the present invention. In one embodiment, the cell based system is a network or a portion of a network such as LAN 100.

With reference now to 402 of FIG. 4, and to FIG. 2, one embodiment receives a request to generate a cell based system of resources. As described herein, the cell based system in one embodiment is a virtual LAN, farm, or the like. In one embodiment, the user request will include a quality ranking for the requested resource farm, a priority ranking for the requested resource farm, a redundancy ranking for the requested resource farm and the like.

For example, the request for system resources could include a request for a farm having system resources a, b and c with a quality ranking of at least 'x' and a redundancy of 'y'. In one embodiment, the system resources a, b and c denote resources such as CPU, memory, IO cards, and the like. The quality ranking 'x' is, in one embodiment, a number ranking assigned to each resource based on its error rate, expected reliability and the like. For example, each resource may have a ranking of 1-5 where 1 doesn't work and 5 is excellent/no error operation. The redundancy 'y' is used to assign multiple of the same resource. For example, a redundancy 'y' could mean a requested resource should have redundancy. In another embodiment, the redundancy 'y' is a numerical value wherein a 0 is no redundancy, 1 is IO redundancy, 2 is IO+CPU redundancy and 3 is mirror memory+IO+CPU redundancy. Although examples of redundancy 'y' and quality 'x' are described herein, the assignment of the 'y' and 'x' values may be any of a plurality of possible configurations, alphanumeric combinations, or other personal or business preference combinations. The utilization of the configurations described herein is merely for purposes of brevity and clarity.

Referring now to 404 of FIG. 4 and to FIG. 2, one embodiment accesses a list of allocatable resources having corresponding evaluation data. One exemplary embodiment for testing the allocatable resources is described in detail in Flowchart 500 of FIG. 5. For example, instead of the system just arbitrarily selecting a resource 207a as the CPU for farm 244A without providing any actual operating information about resource 207a, embodiments will evaluate all the allocatable resources 207. In so doing, the testing will provide information about each allocatable resource 270 and will further provide the capability for comparing the operational characteristics of both resources and selecting the best matching quality ranked resource 270 based on the capability comparison.

Figure 5:
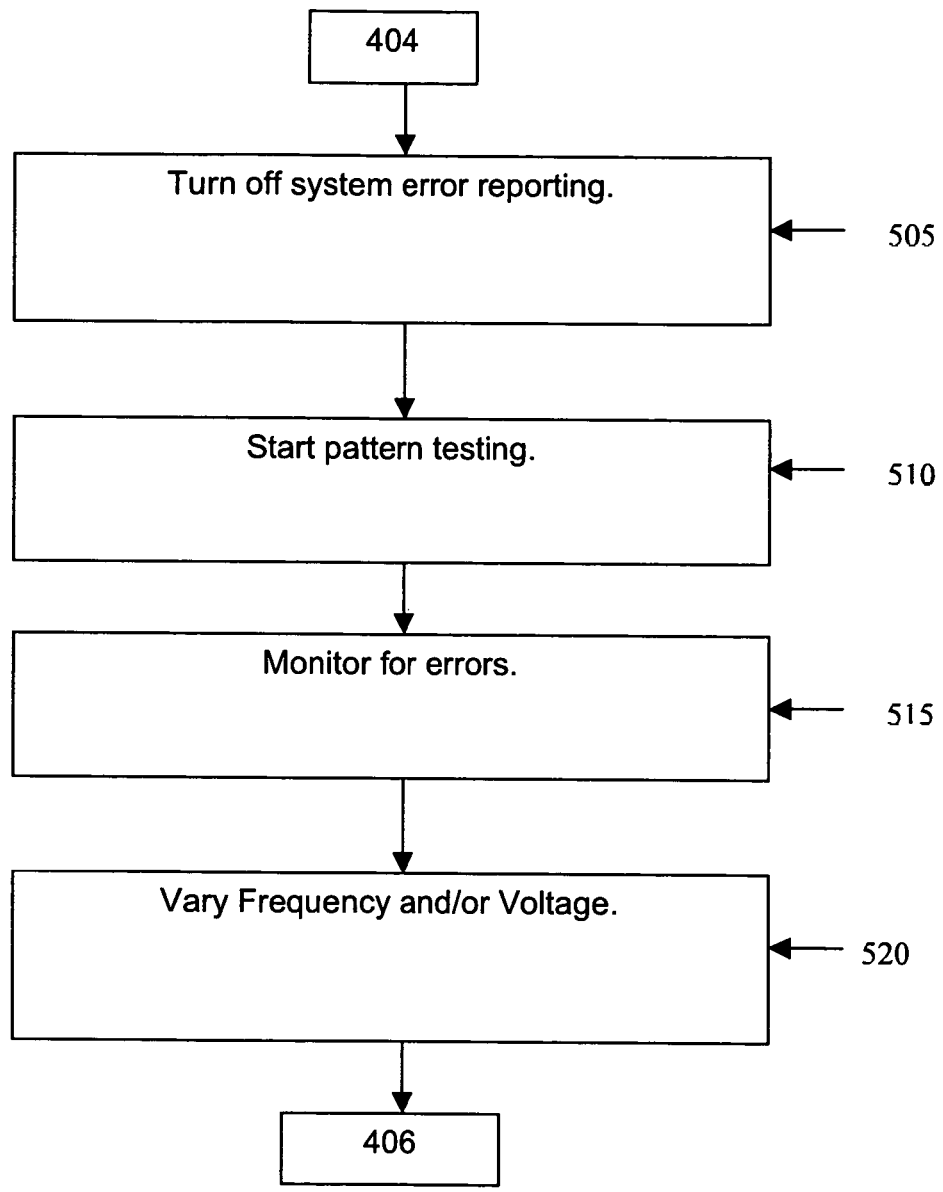
FIG. 5 is a flowchart of an exemplary method for testing resources in accordance with one embodiment of the present invention.

With reference now to 505 of FIG. 5 and to FIG. 2, in one embodiment error reporting to the system is turned off. That is, since each of the allocatable resources 270 will be tested with varying voltage and clock frequency, and in some cases to failure, the system should not be concerned or evaluate the resources based on failure during testing. In other words, if the testing is performed until failure and the failure is reported to the resource manager 205, the resource manager 205 will incorrectly document a resource failure, when the failure actually occurred during a forced failure test.

Referring now to 510 of FIG. 5 and to FIG. 2, one embodiment begins the pattern testing. In one embodiment, the testing is performed at system boot, at specified times throughout system operation (e.g., every month, semi-annually, annually, and the like), when a new resource is added to the pool of allocatable resources, and the like.

With reference now to 515 of FIG. 5 and to FIG. 2, one embodiment starts monitoring the resource pool 207 for errors. In addition, the errors are stored in resource database 325 of FIG. 3. As stated herein, the resource database 325 of FIG. 3 may be a part of the automated resource evaluator and allocator 370 or may be a database located in a different part of network 200.

Generally, the monitoring for errors will continue throughout the testing phase including the applied variations in voltage and frequency. However, in one embodiment, the monitoring is initially started prior to any outside voltage and/or frequency variations to establish a baseline. In other words, by initially monitoring the operation of all allocatable resources 270 under standard operating conditions, a reduced capacity or functionality may be realized.

Referring now to 520 of FIG. 5 and to FIG. 2, one embodiment tests the allocatable resources by varying frequency and/or voltage. For example, the voltage may be varied from low to high at the allocatable resources. In another embodiment, the frequency is varied from low to high at the allocatable resources. The testing cycle can include either just the testing of voltage variation, or frequency variation, or a combination of both voltage and frequency variations. These testing cycle selections can be based on previous operational conditions, previous failures, assumed operational shortcomings, user defined preferences, or the like. Although voltage and frequency variation is described herein, it is appreciated that there may be a plurality of other operational tests applied to the allocatable resources 270. The description of only one subset of possible testing metrics is merely for purposes of brevity and clarity.

In one embodiment, the voltage variation is performed until failure of any or all of the allocatable resources 270. For example, if five allocatable resources 270 are being tested, the testing may be performed until four of the five resources have failed. In another embodiment, the testing will continue until all five resources fail.

With reference now to 406 of FIG. 4 and to FIG. 2, one embodiment compares the request for the cell based system (e.g., farm) with the list of allocatable resources and corresponding evaluation data. In one embodiment, the testing of the resources is serialized after a resource request. However, in another embodiment, the testing of the resources is occurs in parallel with or asynchronous with the request for resources. That is, when a request is made, the quality ranking can be immediately looked up.

In one embodiment, the comparison is performed by the resource manager 205. For example, as shown in the table 1 below, each allocatable resource 207 will have the accompanying data regarding serial number, physical address, OS owner, redundant resources (e.g., other resources in the table that are redundant with the resource), quality ranking, and the like. Although table 1 herein describes a table of stated resource characteristics, the actual table may include more of fewer resource characteristics. The utilization of the resource characteristics in table 1 described herein is merely for purposes of brevity and clarity.

TABLE 1

| Serial number #1 | Physical address #1 | OS owner #1 | Redundant with what serial # | Quality rank #1 |
|---|---|---|---|---|
| Serial number #2 | Physical address #2 | OS owner #2 | Redundant with what serial # | Quality rank #2 |

In general, the resource characteristics, such as those shown in table 1, are utilized to ensure the provisioned resource is compatible with the requested farm characteristics. For example, a mission critical resource allocation would request the best resources with full redundancy. Therefore, the resource manager 205 would select the best resources for the mission critical allocation based on the known resource characteristics thereby increasing probability of success. However, a low priority request for a resource allocation would include low or no redundancy and quality ranking. Therefore, the resource manager 205 would be able to select mediocre or deficient resources for the allocation.

For example, if resource 207b had overall characteristics that are higher than that of resource 207a, then resource 207b would be selected for the mission critical farm 244a. In another embodiment, if the resource 240b had an overall characteristic that was better than that of resource 240a, but resource 240a matched a redundancy requirement (e.g., mirrored memory) then resource 240a would be selected for the farm 244a since mirrored memory was included in the initial request. In other words, the quality ranking and the configuration requirements can be evaluated and weighted to provide a farm 244a that is most compatible with the initial configuration request.

In another embodiment if a desired quality level is requested but is not available, then, depending on the system configuration any of a plurality of alternate configurations may be utilized. The following is a list of a few of the many possible options available to configure the network. All the possible configurations are not described herein for purposes of brevity and clarity. For example if the desired quality level is not available then a higher quality level m assigned. In another embodiment, a lower quality level is assigned. In yet another embodiment, the user is queried for further action. In yet another embodiment, the task is postponed until the desired quality level is available. Thus, the embodiments described herein are infinitely variable based on observed operation, supposed errors, operational assumptions, desired set-up, and the like. In other words the quality and configuration are modifiable based on user preference, system preference, and the like.

Furthermore, in one embodiment, the quality ranking request may include cost benefits. For example, a request for mission critical allocation would pay a higher cost per resource than a low redundancy/quality ranking request. Therefore, a user would be motivated to request only the necessary level of quality instead of simply requesting the best resources.

Embodiments further provide best resource determination at scheduled run times (e.g., a second evaluation of the same resources), when a new resource is added to the network 200, based on user preference, and the like. For example, the resources 207 within the network 200 may be re-evaluated at any time. By allowing resource re-evaluation during runtime, the system ensures the best resource is utilized in the farm 244. Moreover, if the allocated resource 207 selected at boot time, or at a previous run time evaluation, is no longer the best resource for the farm, a scheduled resource switchover can occur which will reduce the potential for switchover occurring during critical run time. For example, selectively swapping the allocated resource for a non-allocated resource when the results of the second testing of the resources 207 show that the non-allocated resource 207 is operating at a higher quality than the allocated resource 207. In another embodiment, the swapping may be performed by a farm with a higher priority ranking taking an allocated resource 207 from a farm with a lower priority ranking.

Therefore, unlike static determination at system boot or initial allocation, the run time evaluation and scheduled switchover allows the allocated resource to be switched as the quality of resources change during runtime. For example, during runtime the allocated resources 207a and non-allocated resource 207b are evaluated. At that time, it is apparent that allocated resource 207a is running at a reduced rate in comparison with non-allocated resource 207b. Resource manager 205 will then scheduled a switchover such that resource 207b will be allocated to the farm and resource 207a will be de-allocated. In so doing, a degraded resource, e.g., resource 207a, is recognized and replaced prior to the farm being detrimentally affected by slowing or failure of the allocated resource 207. In another embodiment, the resources may be monitored while in normal use for items such as correctable errors and the like. This monitored data may be fed into the quality evaluation along with (instead of, or in addition to) the specific testing already discussed.

Thus, embodiments of the present invention provide methods and systems automatically evaluating and allocating resources in a cell based system. Furthermore, embodiments assure that the best matched resources are chosen for the farm. In addition, embodiments provide highly accurate data based on actual allocatable resource testing. Embodiments further provide resource testing at system boot, scheduled runtimes, new resource addition, user preference, and the like. Additionally, by allowing allocated resource evaluation during runtime, the evaluation of the highest quality allocatable resource allows a system to ensure that the best resource is the allocated resource. In other words, lower quality resources do not need to be discarded but can instead be allocated to farms having lower quality ranking requests. Moreover, embodiments described herein work for multi-partitioned systems regardless of the operating system capability of each partition (e.g., farm) since the allocation is performed by the resource manager 205 at a sub OS level. Embodiments also reduce chances for user error when configuring the partitions.

Embodiments of the present invention are thus described. While the present invention has been described in particular embodiments, it should be appreciated that the present invention should not be construed as limited by such embodiments, but rather construed according to the following claims.

We claim:

1. A method for automatically evaluating and allocating resources in a cell based system, said method comprising:
   receiving a request to generate a cell based system of resources;
   accessing a list of allocatable resources having corresponding evaluation data;
   comparing said request to generate said cell based system with said list of allocatable resources having corresponding evaluation data;
   assigning said allocatable resources to said cell based system;
   testing each allocatable resource on said list of allocatable resources; and
   generating a quality ranking result for each said allocatable resource based on said testing;
   performing a second testing of said allocatable resources after a ore-defined time period;
   generating results of said second testing; and
   selectively swapping a primary allocatable resource for a secondary allocatable resource when said results of said second testing of said allocatable resources shows that said primary allocatable resource is operating below a defined quality ranking.

2. The method of claim 1 wherein said testing of said allocatable resources is selected from the testing methods including: error rate testing, operation under higher voltage, operation under lower voltage, operation at higher clock frequency, operation at lower clock frequency and data pattern testing.

3. The method of claim 1 wherein said generating said quality ranking result for said cell based system further comprises:
   evaluating a configuration of said allocatable resource.

4. The method of claim 1 wherein said request to generate cell based system of resources comprises:
   receiving a quality ranking for said cell based system.

5. The method of claim 1 wherein said request to generate cell based system of resources comprises:
   receiving a priority ranking for said cell based system.

6. The method of claim 1 wherein said request to generate said cell based system of resources comprises:
   receiving a redundancy ranking for said cell based system.

7. An automated resource evaluator and allocator for a cell based system comprising:
   a farm request receiver for receiving a request to generate a cell based system of resources;
   a resource database for accessing a list of allocatable resources having corresponding evaluation data;
   an evaluator for comparing said request to generate said cell based system with said list of allocatable resources having corresponding evaluation data;
   a resource assigner for assigning said allocatable resources to said cell based system;
   a resource tester for testing each allocatable resource on said list of allocatable resources; and
   a quality ranker for generating a quality ranking result for each said allocatable resource based on said testing, wherein a second testing of said allocatable resources is performed after a pre-defined time period, results of said second testing are generated, and a primary allocatable resource is selectively swapped for a secondary allocatable resource when said results of said second testing of said allocatable resources shows that said primary allocatable resource is operating below a defined quality ranking.

8. The automated resource evaluator and allocator of claim 7 wherein said testing of said allocatable resources is selected from the testing methods including: error rate testing, operation under higher voltage, operation under lower voltage, operation at higher clock frequency, operation at lower clock frequency and data pattern testing.

9. The automated resource evaluator and allocator of claim 7 wherein said generating said quality ranking result for said cell based system further comprises:
   a configuration evaluator for evaluating a configuration of said allocatable resource.

10. The automated resource evaluator and allocator of claim 7 wherein said request to generate said cell based system of resources comprises a quality ranking for said cell based system.

11. The automated resource evaluator and allocator of claim 7 wherein said request to generate said cell based system of resources comprises a priority ranking for said cell based system.

12. The automated resource evaluator and allocator of claim 7 wherein said request to generate said cell based system of resources comprises a redundancy ranking for said cell based system.

13. A computer-usable medium having computer-readable program code embodied therein for causing a method for automatically evaluating and allocating resources in a cell based system, said method comprising:
   receiving a request to generate a cell based system of resources;
   accessing a list of allocatable resources;
   testing each of said allocatable resources on said list of allocatable resources;
   corresponding evaluation data from said testing with each of said allocatable resources;
   comparing said request to generate said cell based system with said list of allocatable resources and said corresponding evaluation data;
   assigning said allocatable resources to said cell based system;
   evaluating a configuration of said allocatable resource;
   generating a quality ranking result for each of said allocatable resources based on said configuration evaluating and said testing;
   performing a second testing of said allocatable resources after a pre-defined time period;
   generating results of said second testing; and
   selectively swapping a primary allocatable resource for a secondary allocatable resource when said results of said second testing of said allocatable resources shows that said primary allocatable resource is operating below a defined quality ranking.

14. The computer-usable medium of claim 13 wherein said testing each of said allocatable resources is selected from the testing methods including: error rate testing, operation under higher voltage, operation under lower voltage, operation at higher clock frequency, operation at lower clock frequency and data pattern testing.

15. The computer-usable medium of claim 13 wherein said request to generate said cell based system of resources comprises:

receiving a quality ranking for said cell based system;
receiving a priority ranking for said cell based system; and
receiving a redundancy ranking for said cell based system.

* * * * *

UNITED STATES PATENT AND TRADEMARK OFFICE
CERTIFICATE OF CORRECTION

PATENT NO. : 7,586,946 B2 Page 1 of 1
APPLICATION NO. : 11/263502
DATED : September 8, 2009
INVENTOR(S) : Ken Gary Pomaranski et al.

It is certified that error appears in the above-identified patent and that said Letters Patent is hereby corrected as shown below:

In column 9, line 37, in Claim 1, delete "ore-defined" and insert -- pre-defined --, therefor.

In column 9, line 55, in Claim 4, after "generate" insert -- said --.

In column 9, line 58, in Claim 5, after "generate" insert -- said --.

Signed and Sealed this

Fifteenth Day of June, 2010

David J. Kappos
*Director of the United States Patent and Trademark Office*